No. 873,399. PATENTED DEC. 10, 1907.
N. W. WILLIAMS.
COMBINED HEATING AND VENTILATING SYSTEM FOR AUTOMOBILES.
APPLICATION FILED NOV. 2, 1906.
2 SHEETS—SHEET 2.
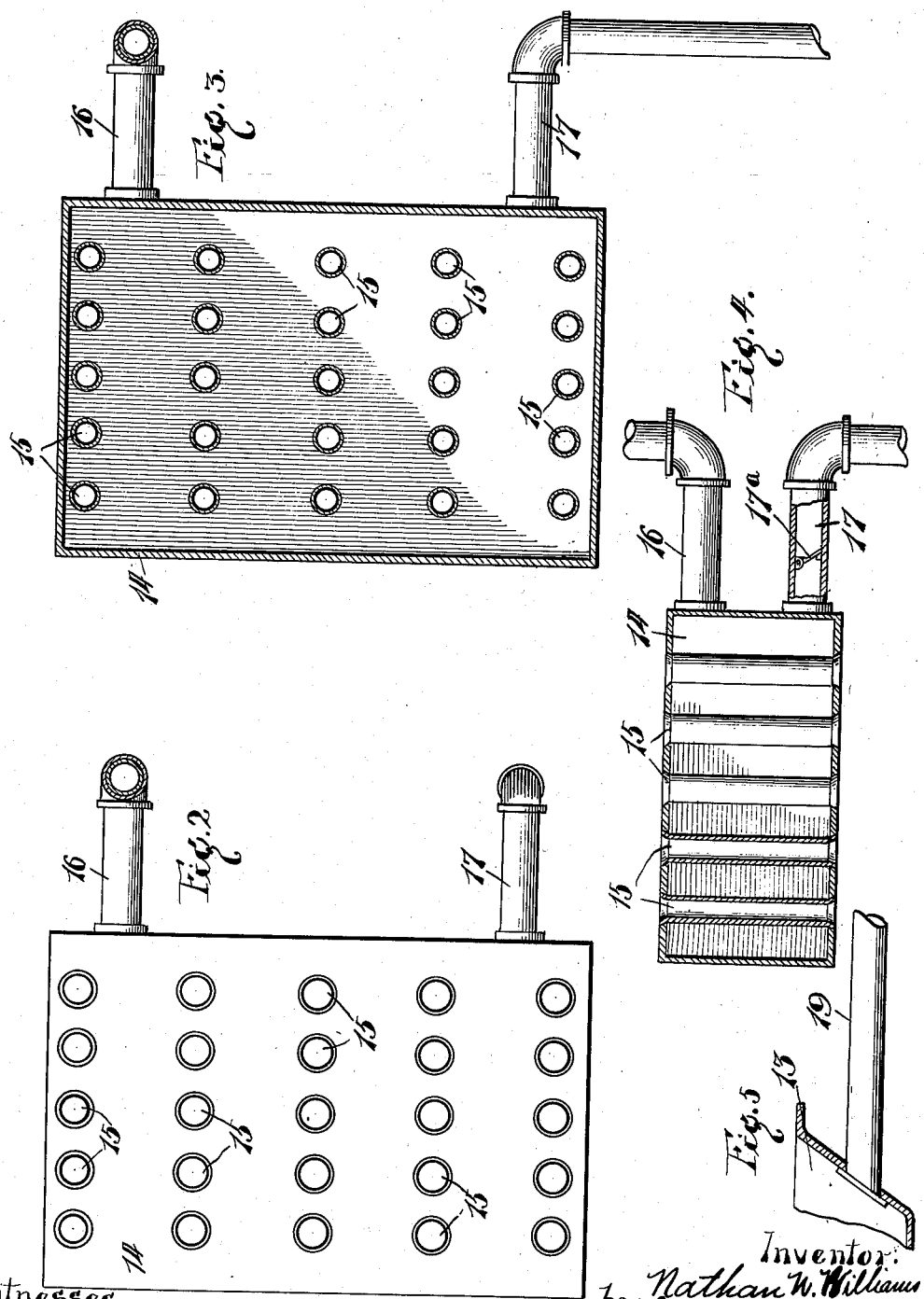

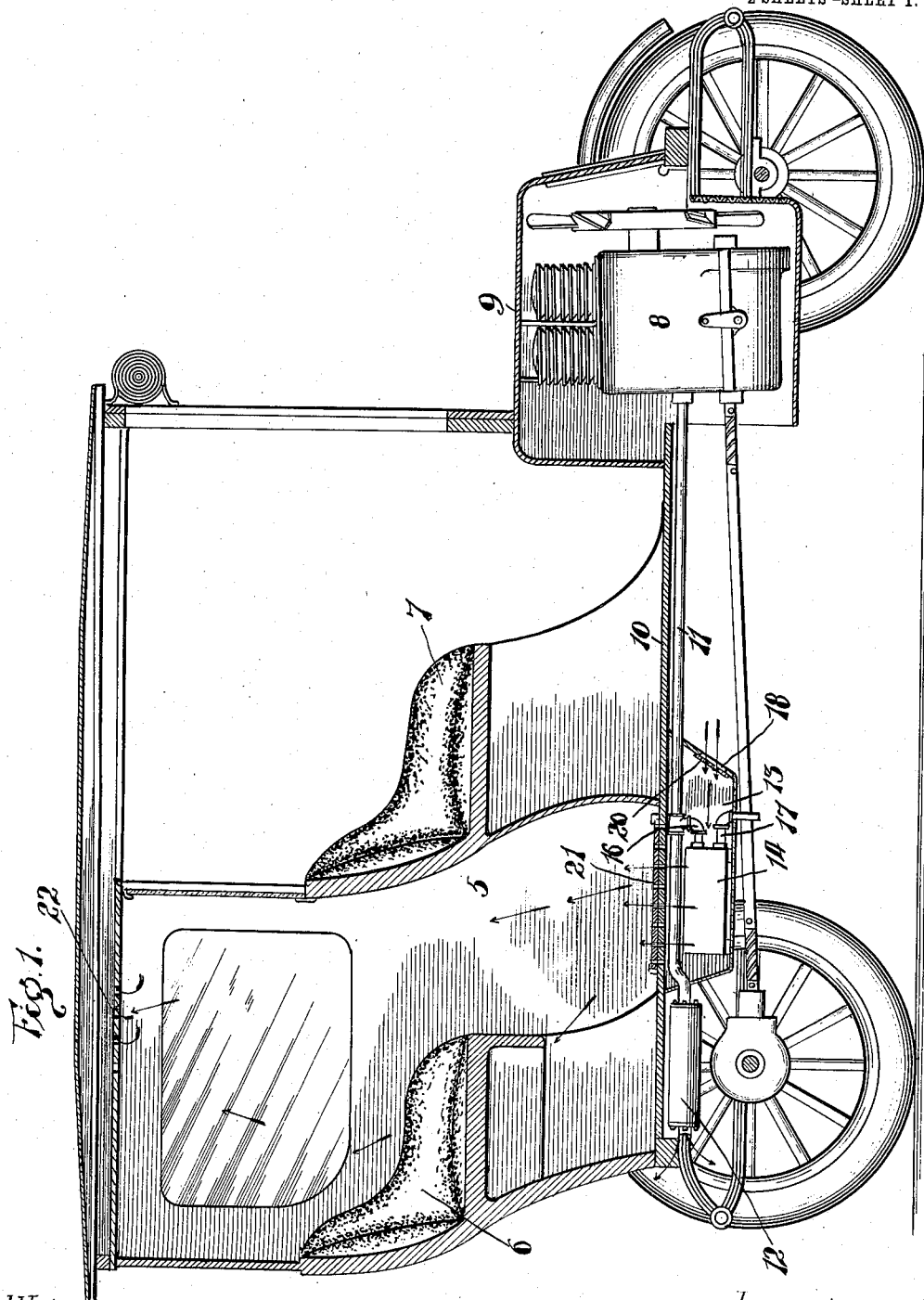

UNITED STATES PATENT OFFICE.

NATHAN W. WILLIAMS, OF EVANSTON, ILLINOIS.

COMBINED HEATING AND VENTILATING SYSTEM FOR AUTOMOBILES.

No. 873,399.  Specification of Letters Patent.  Patented Dec. 10, 1907.

Application filed November 2, 1906. Serial No. 341.737.

*To all whom it may concern:*

Be it known that I, NATHAN W. WILLIAMS, a citizen of the United States, residing at Evanston, in the county of Cook and State of Illinois, have invented certain new and useful Improvements in a Combined Heating and Ventilating System for Automobiles, of which the following is a specification.

The object of the present invention is to utilize the heat of the escaping products of combustion for heating purposes, by tapping the exhaust pipe intermediate the engine and muffler and conveying a portion of the heated waste gases to a heater located beneath the floor of the automobile for the purpose of heating the air supplied to the closed vehicle body.

The invention is further intended to relieve the muffler by reducing the volume of heated waste gases delivered thereto, and to further relieve the engine by reducing the back pressure owing to the increased facility with which the waste gases are permitted to be discharged.

The invention is intended to be applied more especially to automobiles of any suitable style; but the mechanism to be hereinafter described can with equal readiness be applied to motor boats or launches, so that it will be understood that in the specification and drawings an automobile is shown merely for the purpose of indicating a suitable and convenient method of applying the mechanism of the present invention, and that the same can be applied to vehicles or conveyances of a substantially different type propelled by hydro-carbon power.

The invention consists in the features of construction and combination of parts hereinafter described and claimed.

In the drawings Figure 1 is a sectional elevation of an automobile of the touring car type; Fig. 2 a top or plan view of the radiator box; Fig. 3 a sectional plan view of the same showing the cover cut away and the shape of the discharge pipe slightly modified; Fig. 4 a sectional elevation of the radiator box showing the check valve in the discharge pipe; and Fig. 5 a detail of the front wall of the inclosing box showing a modified form of air intake.

The invention, as shown, is applied to an automobile having a closed compartment 5 provided with a seat 6, in front of which compartment is an open front seat 7 of the usual character. The engine 8 is located in the front part of the vehicle and is covered by a hood 9 of ordinary character, and the engine has leading therefrom beneath the floor 10 of the car an exhaust pipe 11 which connects with a muffler 12 near the rear end of the car and beneath the floor, and the exhaust pipe passes through an inclosing box 13 which is secured to the bottom of the floor beneath the closed portion of the car. The inclosing box has located therein a ventilating box 14 which may be of any suitable shape and size to accommodate it to the proportions of the vehicle intended to be heated. In the present case the box is of oblong rectangular shape, as shown in Figs. 2 and 3, and is of greater width transversely of the car than longitudinally thereof. The radiator box is preferably elevated a slight distance above the floor of the inclosing box to permit the air to circulate all around the radiator box, which, as shown, is provided with a plurality of open end pipes 15 which extend from top to bottom of the radiator box for increasing the circulation and the radiating properties of the box.

The heated waste gases are supplied to the radiator box from a short branch pipe 16 of elbow shape which leads from the top of the forward side of the radiator box to the exhaust pipe for the engine, and is adapted to withdraw a portion of the waste gases from the exhaust pipe and pass them through the radiator box and thereafter discharge them through a discharge pipe 17, having therein a flap check valve 17[a]. The discharge pipe may lead directly out of the bottom of the inclosing box, as shown in Figs. 1 and 4, or the pipe may be extended, as shown in Fig. 3, so as to discharge the waste gas at any suitable point. The discharge pipe enters the radiator box near the lower side of the front wall, which arrangement insures a full circulation of the waste gases into and through the radiator box prior to their discharge.

The air supplied to the radiator box enters the inclosing box through an opening 18, preferably in the forward side of the inclosing box, but it will be understood that the location of the air supply opening may be changed and the form or shape of the opening modified to meet all the requirements of vehicles of different descriptions. In each case it is advisable to locate the opening at a point as free from dust or odors as possible, and in some cases it may be advisable to provide a pipe 19, like that shown in Fig. 5, which leads to a point from which a constant supply of fresh air may be obtained. In order to regulate the amount of air supplied to the inclosing box, a damper 20 may be provided for closing the opening to any desired extent. The heated air passes through a register 21 in the floor of the car immediately above the radiating box, and the register may be of any suitable style or character to regulate the amount of heat supplied to the car. In order to facilitate the heating and ventilating properties of the car, openings 22 are provided in or near the roof, which provides a constant circulation through the inclosed portion of the vehicle.

In use, when the car is in motion, a constant supply of fresh air will be carried through the opening in the forward side of the inclosing box, which fresh air will be heated by coming in contact with the heated surface of the radiating box, a portion of the air passing through the tubes or flues therein, and the air thus heated will be admitted in any suitable quantity through the register in the floor of the car, which is, of course, under the control of the occupant and may be opened or closed to any desired extent. The pulsations of the engine drive the heated waste gases through the discharge pipe, and a portion of such gases will be diverted from the main pipe and carried into and through the radiating box beneath the floor of the vehicle and discharged through the exhaust pipe leading therefrom. The flap valve in the exhaust pipe is hung in such manner as to be readily opened to permit the discharge of waste gas, thereby maintaining a constant circulation through and out of the box, which is necessary in order to withdraw a sufficient quantity of the heated gases to maintain the proper temperature of the radiator box. The flap valve acts as a check valve to prevent the discharged gases from being drawn back into the box by the partial vacuum formed therein by the condensation of the gases. The flap valve prevents this partial vacuum from being relieved by external air or discharged gases which might otherwise be sucked from the discharge outlet into the box. A current in the proper direction is thus maintained at all times. This withdrawal of a portion of the waste gases relieves the muffler to a proportionate extent so that the muffler will not tend to burn out or be impaired so readily as in ordinary cases in which the entire volume of waste gas is discharged through the muffler. The provision of the radiating box, which affords an additional outlet, further relieves the back pressure on the engine to a considerable degree.

It will be understood that the form, location, shape and size of the mechanism will be dependent upon the shape and style of the automobile, motor boat or other vehicle or structure to which the device is applied, and that the device of the present invention can be used in all cases in which it is desirable to employ the surplus heat of a hydro-carbon engine for heating purposes.

What I regard as new and desire to secure by Letters Patent is:

1. In combination with the structure to be heated, a hydro-carbon engine, an exhaust pipe leading therefrom, a muffler secured to the discharge end of the exhaust pipe and in open communication with the atmosphere, an inclosing box, secured to the structure to be heated and provided with an intake opening for supplying fresh air, a register in communication with the inclosing box for controlling the flow of heated air therefrom, a radiator box within the inclosing box, a branch pipe leading from the radiator box to the exhaust pipe intermediate the muffler and the engine, and a discharge pipe, leading from the radiator box and out of the inclosing box and discharging directly into the atmosphere, substantially as described.

2. In combination with the structure to be heated, a hydro-carbon engine, an exhaust pipe leading therefrom, a muffler secured to the discharge end of the exhaust pipe and in open communication with the atmosphere, an inclosing box, secured to the structure to be heated and provided with an intake opening for supplying fresh air, a radiator box within the inclosing box, a branch pipe leading from the radiator box to the exhaust pipe intermediate the muffler and the engine, a valve controlled discharge pipe leading from the radiator box and out of the inclosing box and discharging directly into the atmosphere, and a register in the structure to be heated, for controlling the flow of heated air away from the inclosing box, substantially as described.

3. In combination with the structure to be heated, a hydro-carbon engine, an exhaust pipe leading therefrom, a muffler secured to the discharge end of the exhaust pipe and in open communication with the atmosphere, an inclosing box under the floor of the structure to be heated and provided with an intake opening for supplying fresh air, a radiator box within the inclosing box and elevated above the floor thereof, open ended tubes leading through the radiator box for increasing the circulation thereof, a branch pipe leading from near the top of the radiator box to the exhaust pipe intermediate the muffler and the engine, a valve controlled discharge pipe leading from near the bottom of the radiator box and out of the inclosing box and discharging directly into the atmosphere, and a register in the floor of the structure for controlling the flow of heated air away from the inclosing box, substantially as described.

4. In an automobile, the combination of a closed body, an inclosing box located beneath the floor of the closed body and provided with an intake opening, an engine at the forward end of the automobile, a muffler at the rear end of the automobile in open communication with the atmosphere, an exhaust pipe passing through the inclosing box and connecting the engine with the muffler, a register in the floor of the automobile immediately above the inclosing box for controlling the flow of heated air therefrom, a radiator box within the inclosing box and elevated above the floor thereof, and provided with a plurality of open ended tubes or flues, a branch pipe connecting the radiator box with the exhaust pipe intermediate the engine and the muffler, and a discharge pipe leading from the radiator box through and out of the inclosing box and discharging directly into the atmosphere, substantially as described.

5. In an automobile, the combination of a body portion having a seat, an inclosing box located beneath the floor of the body portion and provided with an intake opening at its forward end, an engine at the forward end of the automobile, a muffler at the rear end of the automobile in open communication with the atmosphere, an exhaust pipe passing through the inclosing box immediately beneath the floor of the automobile, and connecting the engine with the muffler, a register in the floor of the automobile immediately above the inclosing box for controlling the flow of heated air therefrom, a radiator box within the inclosing box and immediately below the exhaust pipe and elevated above the floor of the box, and provided with a plurality of open-ended tubes or flues, a branch pipe connecting the radiator box with the exhaust pipe intermediate the engine and the muffler, and a discharge pipe leading from the radiator box through and out of the inclosing box behind the intake opening therein and discharging directly into the atmosphere, whereby the back pressure on the engine is relieved and the products of combustion passing through the radiator box are discharged behind the intake opening in the inclosing box, substantially as described.

NATHAN W. WILLIAMS.

Witnesses:
SAMUEL W. BANNING,
EPHRAIM BANNING.